(12) United States Patent
Nagase et al.

(10) Patent No.: US 11,313,756 B2
(45) Date of Patent: *Apr. 26, 2022

(54) FLOW RATE CONTROL DEVICE AND ABNORMALITY DETECTION METHOD USING FLOW RATE CONTROL DEVICE

(71) Applicant: FUJIKIN INCORPORATED, Osaka (JP)

(72) Inventors: Masaaki Nagase, Osaka (JP); Kaoru Hirata, Osaka (JP); Yohei Sawada, Osaka (JP); Kouji Nishino, Osaka (JP); Nobukazu Ikeda, Osaka (JP)

(73) Assignee: FUTIKIN INCORPORATED, Osaka (JP)

( * ) Notice: Subject to any disclaimer, the term of this patent is extended or adjusted under 35 U.S.C. 154(b) by 982 days.

This patent is subject to a terminal disclaimer.

(21) Appl. No.: 16/063,794

(22) PCT Filed: Dec. 15, 2016

(86) PCT No.: PCT/JP2016/005143
§ 371 (c)(1),
(2) Date: Jun. 19, 2018

(87) PCT Pub. No.: WO2017/110066
PCT Pub. Date: Jun. 29, 2017

(65) Prior Publication Data
US 2020/0232873 A1 Jul. 23, 2020

(30) Foreign Application Priority Data

Dec. 25, 2015 (JP) .............................. JP2015-253577

(51) Int. Cl.
*G01M 3/28* (2006.01)
*G05D 7/06* (2006.01)
(52) U.S. Cl.
CPC ........ *G01M 3/2876* (2013.01); *G05D 7/0647* (2013.01)

(58) Field of Classification Search
CPC ........ G01M 3/2876; G01F 1/42; G01F 1/363; G01F 15/005; G01F 15/04; G01F 15/002;
(Continued)

(56) References Cited

U.S. PATENT DOCUMENTS 6,964,279 B2 * 11/2005 Ohmi .................. G05D 7/0635
137/487.5
7,367,241 B2 * 5/2008 Ohmi ....................... G01F 1/42
73/861.52
8,393,227 B2 * 3/2013 Itoh ................... H01L 21/67253
73/861.42
8,606,412 B2 * 12/2013 Nagase ................ G01F 15/022
700/282

(Continued)

FOREIGN PATENT DOCUMENTS

| EP | 2 037 345 A1 | 3/2009 |
|---|---|---|
| JP | 2001-242940 A | 9/2001 |
| JP | 2004-138425 A | 5/2004 |
| JP | 2004-212099 A | 7/2004 |

(Continued)

OTHER PUBLICATIONS

International Search Report issued in PCT/JP2016/005143; dated Feb. 28, 2017.

*Primary Examiner* — Judy Nguyen
*Assistant Examiner* — Martin Walter Braunlich
(74) *Attorney, Agent, or Firm* — Studebaker & Brackett PC

(57) ABSTRACT

An abnormality detection method performed using a flow rate control device including a restriction portion, a control valve, a first pressure sensor, a second pressure sensor, and a downstream valve, includes a step of changing the control valve and the downstream valve from an open state to a closed state, a step of measuring an upstream pressure or a downstream pressure in the closed state, and at least one step of (a) extracting an upstream pressure at a point when a difference between the upstream pressure and the downstream pressure reaches a predetermined value as an (Continued)

upstream convergence pressure, and extracting the downstream pressure as a downstream convergence pressure, and (b) extracting the time from a point when the control valve are changed to a closed state to a point when a difference between the upstream pressure and the downstream pressure reaches a predetermined value as a convergence time.

11 Claims, 3 Drawing Sheets

(58) Field of Classification Search
CPC ........... G01F 1/6847; G01F 1/34; G05D 7/06; G05D 16/08; G05D 16/20; G05D 7/0635; G05B 23/02; G05B 23/0208; G05B 23/0221; G05B 23/0235; F16K 31/06; F16K 31/004; A61M 2205/3334
See application file for complete search history.

(56) References Cited

U.S. PATENT DOCUMENTS

| | | | |
|---|---|---|---|
| 9,791,867 B2* | 10/2017 | Nagase | ................. G01F 15/005 |
| 2003/0061888 A1 | 4/2003 | Gould et al. | |
| 2009/0292399 A1 | 11/2009 | Nagase et al. | |
| 2009/0326719 A1* | 12/2009 | Nagase | ............... F16K 37/0091 |
| | | | 700/282 |
| 2011/0108138 A1 | 5/2011 | Sugita et al. | |
| 2019/0094847 A1* | 3/2019 | Nagase | .............. G05B 23/0291 |

FOREIGN PATENT DOCUMENTS

| | | |
|---|---|---|
| JP | 2008-015581 A | 1/2008 |
| JP | 2009-265988 A | 11/2009 |
| KR | 10-1115350 B1 | 3/2012 |
| WO | 2003/071247 A1 | 8/2003 |
| WO | 2008/004334 A1 | 1/2008 |

* cited by examiner (a)

(b)

FLOW RATE CONTROL DEVICE AND ABNORMALITY DETECTION METHOD USING FLOW RATE CONTROL DEVICE

TECHNICAL FIELD

The present invention relates to a flow rate control device and an abnormality detection method using the flow rate control device, particularly to a technique for detecting the presence or absence of abnormality in a control valve and a downstream valve or a restriction portion, etc., in a fluid supply system including a pressure-type flow rate control device.

BACKGROUND ART

In semiconductor manufacturing equipment and chemical plants, various types of flow meters and flow rate control devices are used to control the flow rate of material gases, etching gases and the like. Among these, a pressure-type flow rate control device is widely used since it can control the flow rates of various fluids highly accurately by a relatively simple mechanism which is a combination of a piezo element-driven pressure control valve and a restriction portion (for example, an orifice plate).

Patent document 1 discloses a pressure-type flow rate control device configured to control a flow rate using a pressure sensor provided on the upstream side of a restriction portion. The pressure-type flow rate control device described in patent document 1 controls the flow rate by using the principle that the flow speed of the gas passing through the restriction portion is fixed to the speed of sound and the flow rate is determined not by a gas pressure P2 on the downstream side but by the gas pressure P1 on the upstream side when satisfying the following critical expansion condition: P1/P2≥about 2 (P1: gas pressure on the upstream side of the restriction portion, P2: gas pressure on the downstream side of the restriction portion).

When the critical expansion condition is satisfied, flow rate Qc is given by, for example, the following formula.

$$Qc = S \cdot C \cdot P1/T1^{1/2}$$

Wherein, S is the area of a cross section of an orifice; C is a constant determined by the gas property (flow factor); and T1 is a gas temperature on the upstream side. The above equation shows that, when the gas temperature T1 and flow factor C are constant, the flow rate Qc is proportionate to the upstream pressure P1. Therefore, the flow rate can be controlled highly accurately only by controlling the upstream pressure P1 by the opening and closing adjustment of the control valve.

Moreover, as well as the pressure sensor on the upstream side, a pressure-type flow rate control device having a pressure sensor provided also on the downstream side of the restriction portion is known (for example, patent document 2). When a pressure sensor on the downstream side is provided, the difference between the upstream pressure P1 and downstream pressure P2 is low, and therefore the flow rate can be calculated even when the critical expansion condition is not satisfied. Specifically, based on the upstream pressure P1 and the downstream pressure P2 measured by the respective pressure sensors, the flow rate Qc can be calculated from a predetermined equation $Qc = KP2^m(P1-P2)^n$ (wherein K is a proportionality constant depending on the type of the fluid and the fluid temperature, and m, n are exponents derived from an actual flow rate).

PRIOR ART DOCUMENT

Patent Literature

Patent document 1: Japanese Unexamined Patent Publication No. 2004-212099
Patent document 2: Japanese Unexamined Patent Publication No. 2004-138425
Patent document 3: Japanese Unexamined Patent Publication No, 2009-265988
Patent document 4: Japanese Unexamined Patent Publication No. 2008-15581

SUMMARY OF INVENTION

Technical Problem

In a pressure-type flow rate control device, a restriction portion having a micro opening (orifice) through which a gas flows formed therein is used, and when clogging or a change in the shape occurs in this micro opening, it is difficult to control the flow rate with high accuracy. For this problem, patent document 3 discloses a constitution which determines the state of the restriction portion based on the pressure drop characteristics when the control valve is rapidly closed, and allows self-diagnosis of the accuracy of the flow rate control.

Moreover, patent document 4 discloses a flow rate control device which judges whether or not the operation of the valve on the downstream side is normal based on the magnitude of a variation in the upstream pressure caused by opening of the valve provided on the downstream side of the restriction portion.

In this manner, in a pressure-type flow rate control device, it is important to detect whether or not any change has been caused from the normal state in a restriction portion and valves provided upstream or downstream thereof, etc., for performing stable flow rate control operation. Moreover, it is desirable that the detection of abnormality is performed with a pressure flow rate control device incorporated in a fluid supply system as in a simple procedure as possible.

The present invention has been made to solve the problem mentioned above, and a main object of the present invention is to provide a method for easily detecting the abnormality of the valves and restriction portion using a flow rate control device in a fluid supply system.

Solution to Problem

A method for detecting abnormality according to an embodiment of the present invention is an abnormality detection method using a flow rate control device including a restriction portion, a control valve provided on the upstream side of the restriction portion, a first pressure sensor provided on the upstream side of the restriction portion and on the downstream side of the control valve, and a second pressure sensor provided on the downstream side of the restriction portion, and a downstream valve provided on the downstream side of the second pressure sensor, the method including a step of changing the control valve and downstream valve from an open state to a closed state, a step of measuring an upstream pressure and a downstream pressure using the first pressure sensor and the second pressure sensor with the control valve and downstream valve left in the closed state, including at least one step of the following step (a) and step (b): (a) a step of extracting the upstream pressure at the point when a difference between the upstream pressure and the downstream pressure reaches a predetermined value or becomes lower than the predetermined value as an upstream convergence pressure, and extracting the downstream pressure as a downstream convergence pressure, (b) a step of extracting the time from the point when the control valve and downstream valve are changed from an open state to a closed state to the point when a difference between the upstream pressure and the downstream pressure reaches a predetermined value or becomes lower than the predetermined value as a convergence time, judge the presence or absence of abnormality based on the comparison of the data obtained in either the step (a) or the step (b) with the values which are the reference of the data.

In one embodiment, the above-mentioned abnormality detection method includes both step (a) of extracting the upstream convergence pressure and the downstream convergence pressure and a step (b) of extracting the convergence time, and judges the presence or absence of abnormality based on the comparison of both data obtained in the step (a) and the step (b) with reference values, respectively.

In one embodiment, a reference pressure is set to be the reference value for the upstream convergence pressure and the downstream convergence pressure, and a reference time is set to be the reference value for the convergence time.

In one embodiment, the reference pressure is a convergence pressure measured in advance in a normal state, and the reference time is a convergence time measured in advance in a normal state.

In one embodiment, the above-mentioned abnormality detection method further includes a step of measuring the upstream pressure and the downstream pressure in the open state before the control valve and downstream valve are closed using the first pressure sensor and the second pressure sensor, a step of determining the reference pressure and the reference time based on the upstream pressure and the downstream pressure in the open state measured.

In one embodiment, the above-mentioned abnormality detection method includes a step of preparing in advance a table which indicates the upstream pressure and the downstream pressure in the open state, and the relationship between the reference time and the reference pressure, and a step of determining the reference pressure and the reference time according to the table.

In one embodiment, a predetermined value of a difference between the upstream pressure and downstream pressure is set to 0, and at a point when the upstream pressure and the downstream pressure are the same, the upstream convergence pressure, the downstream convergence pressure or the convergence time is extracted.

In one embodiment, a sheet leak of the control valve and downstream valve is detected based on the upstream convergence pressure or the downstream convergence pressure, and expansion and reduction of an opening portion of the restriction portion is detected based on the convergence time.

In one embodiment, the flow rate control device further includes a temperature sensor provided on the downstream side of the control valve, and the above-mentioned abnormality detection method further includes a step of correcting the upstream convergence pressure or the downstream convergence pressure based on an output of the temperature sensor.

In one embodiment, when, in a state that the control valve and downstream valve are maintained in a closed state, a difference between the upstream pressure and the downstream pressure is maintained to be shifted from a value which is a reference even after convergence, it is judged that the first pressure sensor or the second pressure sensor is abnormal.

The flow rate control device according to an embodiment of the present invention includes a restriction portion, a control valve provided on the upstream side of the restriction portion, a first pressure sensor provided on the upstream side of the restriction portion and on the downstream side of the control valve, a second pressure sensor provided on the downstream side of the restriction portion, and an arithmetic processing circuit for controlling a flow rate to be a specified flow rate by controlling the control valve based on outputs of the first pressure sensor and the second pressure sensor, wherein a downstream valve which is built inside the flow rate control device or placed outside the flow rate control device is provided downstream of the second pressure sensor, the arithmetic processing circuit calculates a difference between an upstream pressure and a downstream pressure based on outputs the first pressure sensor and the second pressure sensor in a state that the control valve is closed when the downstream valve is closed; performs either or both comparison of comparing the upstream pressure or the downstream pressure a reference pressure stored in a memory at a point when the difference obtained by the calculation reaches a predetermined value or becomes lower than the predetermined value, and comparing a time from a point when the control valve and the downstream valve becomes closed to a point when the difference reaches a predetermined value or becomes lower than a predetermined value with a reference time stored in a memory; and generates an abnormality judgement signal based on the comparison with the reference pressure or the reference time.

Effect of Invention

According to embodiments of the present invention, abnormality of valves and a restriction portion can be detected readily and highly accurately using a flow rate control device.

MODE FOR CARRYING OUT INVENTION

Embodiments of the present invention will be described below with reference to the drawings, but the present invention is not limited to the embodiments provided below.

Figure 1:
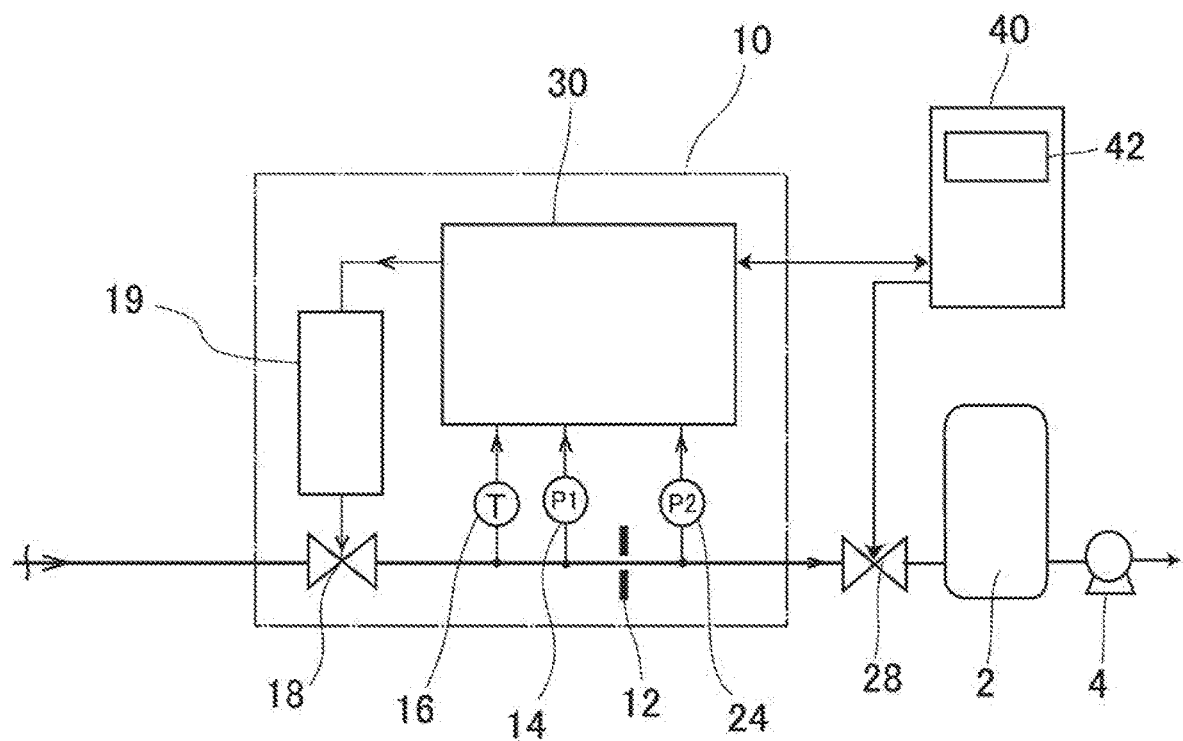
FIG. 1 is a drawing which schematically shows the configuration of a pressure-type flow rate control device according to an embodiment of the present invention.

FIG. 1 is a drawing which schematically shows configuration of a pressure-type flow rate control device 10 according to an embodiment of the present invention. The flow rate control device 10 includes a restriction portion 12

(for example, an orifice plate) having a micro opening and lying in a gas supply passage (channel), a first pressure sensor 14 and a temperature sensor 16 provided on the upstream side of the restriction portion 12, and a control valve 18 provided on the upstream side of the first pressure sensor 14. Moreover, the flow rate control device 10 includes a second pressure sensor 24 on the downstream side of the restriction portion 12. The first pressure sensor 14 is capable of measuring the pressure in a channel between the control valve 18 and the restriction portion 12, and the second pressure sensor 24 is capable of measuring the pressure in a channel between the restriction portion 12 and the and downstream valve 28 (described later).

The flow rate control device 10 further includes an arithmetic processing circuit 30 which controls the opening and closing operation of the control valve 18 based on outputs of the first pressure sensor 14 and the second pressure sensor 24. The arithmetic processing circuit 30 compares a specified flow rate received from an external control device 40 with the flow rate calculated from the outputs of the first and second pressure sensors 14, 24, and controls a drive unit 19 of the control valve 18 to bring the flow rate closer to a specified flow rate.

In the flow rate control device 10, the channel may be formed as a hole provided in a metallic block. Moreover, as the first pressure sensor 14 and the second pressure sensor 24, for example, a sensor chip of a silicon single crystal and a pressure sensor having diaphragm built therein are used. The first pressure sensor 14 and the second pressure sensor 24 may have the same rated pressure. Moreover, as the control valve 18 for example, a metallic diaphragm valve is used, and, for example, a piezo element drive unit (piezo actuator) is used as the drive unit 19.

In the fluid supply system including the thus-configured flow rate control device 10, the upstream side of the control valve 18 is connected to a gas supply source (not illustrated) such as raw material gas and carrier gas, and the downstream side of the second pressure sensor 24 is connected to a process chamber 2 of the semiconductor manufacturing equipment via the downstream valve 28. A vacuum pump 4 is connected for performing vacuum process to the process chamber 2, and at the time of gas supply, the inside of the process chamber 2 is vacuumed.

In the above configuration, to completely shut off the supply of gas into the process chamber 2, a valve which has less leak and higher valve closing force than the control valve 18 may be used as the downstream valve 28. Moreover, FIG. 1 shows an aspect that the downstream valve 28 is placed on the outside of the flow rate control device 10, but the downstream valve 28 may be built in the flow rate control device 10 on the downstream side the restriction portion 12 (and the second pressure sensor 24) of the flow rate control device 10. The abnormality detection method according to this embodiment described later can be carried out by using either the downstream valve 28 placed outside of the flow rate control device 10 or the downstream valve 28 built in the flow rate control device 10. Moreover, the opening and closing operation of the downstream valve 28 is controlled by the external control device 40 in this embodiment, but may be controlled by the arithmetic processing circuit 30 in another aspect.

In a semiconductor production line, a plurality of channels for supplying different types of gases is connected to the process chamber 2. Therefore, in an actual aspect, the flow rate control device 10 and the downstream valve 28 are provided for the channels of the respective gases. The switching of types of the gas supplied to the process chamber 2 can be performed by the opening and closing control of the downstream valve 28 provided in each channel.

When performing flow rate control, the specified flow rate set in the external control device 40 is transmitted from the external control device 40 to the arithmetic processing circuit 30. The arithmetic processing circuit 30 calculates a flow rate based on a flow rate equation under a critical expansion condition or non-critical expansion condition based on the outputs of the first and second pressure sensors 14, 24 (and the output of the temperature sensor 16 (gas temperature T1)), and controls the control valve 18 so that the flow rate of a fluid which passes through the restriction portion 12 becomes the specified flow rate. Moreover, the arithmetic processing circuit 30 can output the calculated flow rate to the external control device 40 as a flow rate output value, and indicate the flow rate output value on a display portion 42 provided on the external control device 40.

Figure 2:
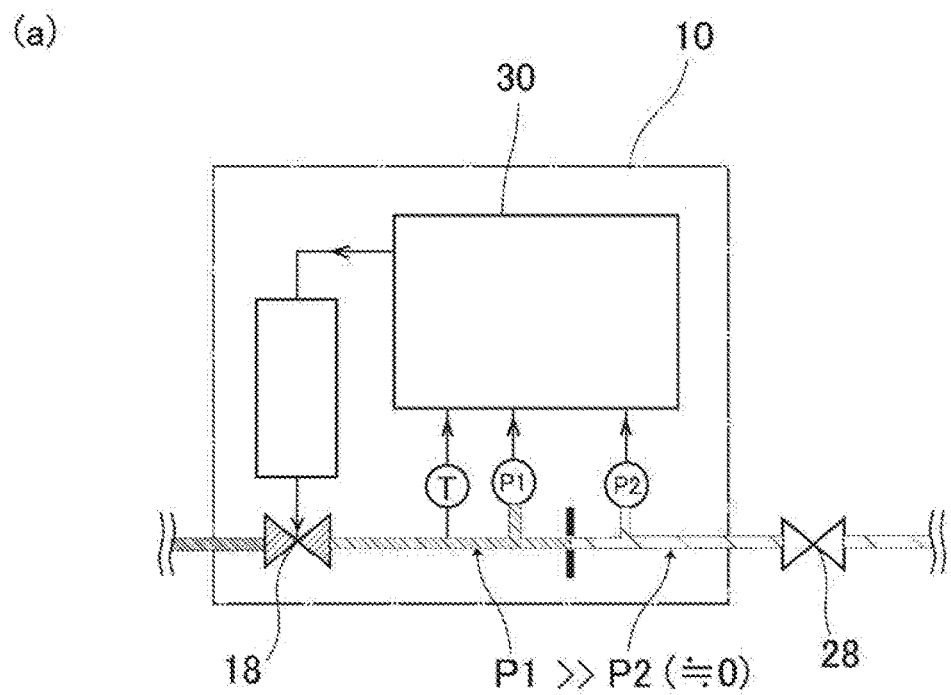
FIGS. 2 (a) and 2 (b) are schematic diagrams which show the state of the time of fluid supply and the state of the time of abnormality detection, respectively.
Figure 2:
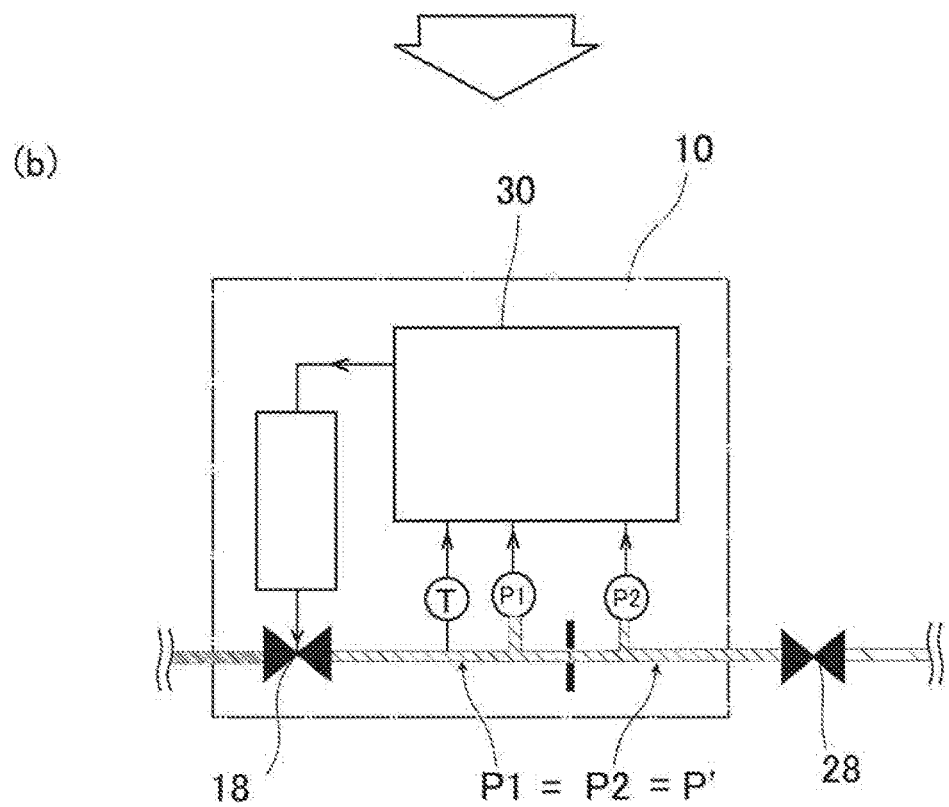

In a state that the gas is flowing in accordance with the specified flow rate in this manner, as shown in FIG. 2 (*a*), the control valve 18 is opened in such a valve opening degree that conforms to the specified flow rate, and the downstream valve 28 is also set to an open state. At this time, upstream pressure P1 and downstream pressure P2 are maintained to be in different constant pressures from each other, and more specifically, the upstream pressure P1 is maintained to a control pressure based on the specified flow rate, the downstream pressure P2 is maintained to, for example, a vacuum pressure. When the critical expansion condition is met, the upstream pressure P1 is set to at least about twice higher the downstream pressure P2.

Herein, in the abnormality detection method of this embodiment, as shown in FIG. 2 (*b*), the control valve 18 and the downstream valve 28 are changed from an open state to a closed state. It should be noted that the valves 18, 28 shown in solid black in FIG. 2 (*b*) mean that they are closed.

The operation for closing the control valve 18, for example, can be performed by setting the specified flow rate to 0 transmitted from the external control device 40 to the flow rate control device 10. Moreover, the downstream valve 28 is set to a closed state by the external control device 40 for example. This causes both the upstream pressure P1 and the downstream pressure P2 to turn to an equilibrium pressure P'.

Figure 3:
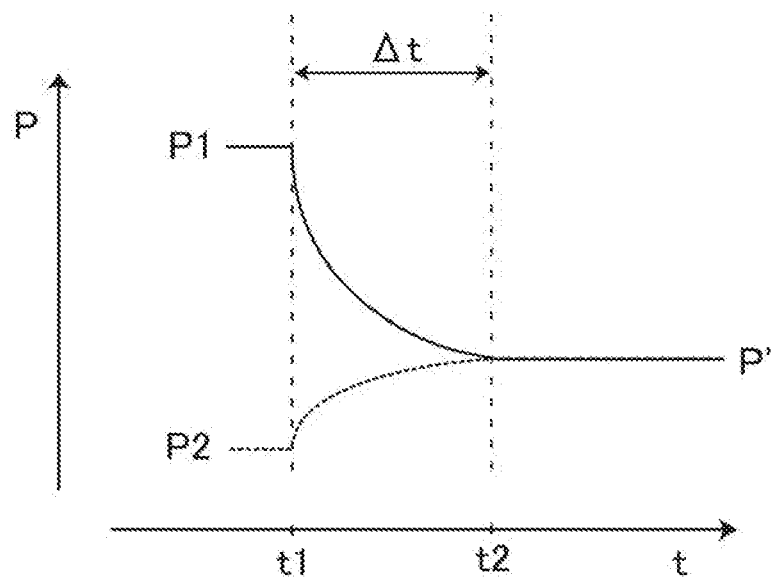
FIG. 3 is a graph which shows changes in an upstream pressure P1 and a downstream pressure P2 when a valve closing operation is performed from the time of fluid supply.

FIG. 3 is a graph which shows the change in the upstream pressure P1 and the downstream pressure P2 when the closing of the control valve 18 and the downstream valve 28 is performed from a gas flowing state. As shown in FIG. 3, when the control valve 18 and the downstream valve 28 are closed at a time t1 and the closed state is then kept, the upstream pressure P1 drops from an initial pressure of the gas flowing state, while the downstream pressure P2 elevates from an initial pressure of the gas flowing state. That is, a pressure fluctuation occurs so that a differential pressure is balanced. Moreover, since the closed state of the valves 18, 28 on both sides is kept, the upstream pressure P1 and downstream pressure P2 converge to substantially the same equilibrium pressure P' over time.

In this process, the arithmetic processing circuit 30 shown in FIG. 1 continuously calculates the difference P1-P2 between the upstream pressure P1 and downstream pressure P2 from the outputs of the first pressure sensor 14 and second pressure sensor 24. In addition, in this embodiment, when the difference P1-P2 becomes 0 (that is, when the upstream pressure P1 and downstream pressure P2 are the same), the pressures P1, P2 at that time (herein, the same pressure value P') are detected or extracted as convergence pressures or equilibrium pressures.

In this specification, when it is described that the difference P1-P2 becomes 0 (that is, the upstream pressure P1 and downstream pressure P2 are the same), the case when the difference is not completely 0 and a slight difference is caused due to an error may be included. For example, the difference P1-P2 is a predetermined ratio of the convergence pressure P' or lower or a predetermined value specified in advance or lower, it can be determined that the difference P1-P2 is substantially 0, that is, the upstream pressure P1 and the downstream pressure P2 are substantially the same. Moreover, it can be also considered that a point when the difference P1-P2 reaches a predetermined value having a certain magnitude specified in advance or becomes lower than the predetermined value is the time of convergence.

When the point at which the difference P1-P2 is not 0 is determined as the time of convergence, the upstream pressure and the downstream pressure at the time of convergence are different. Therefore, the arithmetic processing circuit 30 may be configured to extract an upstream convergence pressure P1' and a downstream convergence pressure P2', respectively, at that point, considering the difference P1-P2 is not higher than the predetermined value (that is, when the difference reaches the predetermined value or becomes lower than the predetermined value) as the time of convergence.

Upon detecting the convergence pressure as mentioned above, the arithmetic processing circuit 30 extracts the time from a point of start of change t1 of the upstream pressure P1 and downstream pressure P2 (that is, the point when the control valve 18 and the downstream valve 28 changes from an open state to a closed state) until a point of pressure convergence t2 (that is, a point when the difference P1-P2 is substantially 0) mentioned above as a convergence time $\Delta t$. Also at this time, the arithmetic processing circuit 30 may extract the convergence time $\Delta t$ considering the difference P1-P2 is not higher than the predetermined value (that is, when the difference reaches the predetermined value or becomes lower than the predetermined value) as the time of convergence.

The thus-determined convergence pressure P' and convergence time $\Delta t$ (hereinafter may be collectively referred to as measurement values or data) are compared with a reference pressure P0 specified in advance and a reference time $\Delta t0$ specified in advance, and the detection of abnormality is performed based on the comparison results. Moreover, as mentioned above, when the upstream convergence pressure P1' and downstream convergence pressure P2' are measured individually, the respective data (the upstream convergence pressure P1' and downstream convergence pressure P2') may be compared with a reference upstream pressure P01 and a reference downstream pressure P02, respectively, to judge the presence or absence of abnormality.

In this embodiment, the reference pressure P0 and reference time $\Delta t0$ (hereinafter may be collectively referred to as reference values) are the convergence pressure P0 and convergence time $\Delta t0$ measured similarly at the time of normal state. The reference pressure P0 and reference time $\Delta t0$ are measured in advance in an initial stage of use or the like where a normal state is confirmed, and are stored in a memory (storage device) provided in the arithmetic processing circuit 30. However, as the reference values, measurement values in an abnormal state, previous measurement values, specified values obtained not by measurement or the like can be also used.

Moreover, when the measurement values during normal time are used as the reference values as in this embodiment, it is preferable that the reference pressure P0 and reference time $\Delta t0$ are obtained under similar conditions to those when detecting abnormality. For example, it is required that the reference pressure P0 and reference time $\Delta t0$ are the convergence pressure and convergence time in a normal state measured with the same initial upstream pressure P1 and initial downstream pressure P2 (or specified value of flow rate) as those used when detecting abnormality. Therefore, a set of a plurality of the reference pressures P0 and the reference times $\Delta t0$ corresponding to a set of a plurality of the initial upstream pressures P1 and initial downstream pressures P2 (or a plurality of specified values of flow rate) are stored in the memory in advance, and when abnormality is detected, the corresponding reference values may be used.

Described more specifically, it can be so configured that a table which indicates initial upstream pressure and initial downstream pressure in an open state, and the relationship between a reference time and reference pressure is stored in advance in a memory provided in the flow rate control device 10 and external devices, and the reference pressure and reference time are determined by using this. In this case, the flow rate control device 10 can be so configured to first measure the initial upstream pressure and initial downstream pressure before conducting abnormality detection (that is, before the control valve 18 and the downstream valve 28 are closed) using the first pressure sensor and the second pressure sensor, determine the reference pressure and reference time corresponding to these initial upstream pressure and initial downstream pressure from the above-mentioned table, and perform abnormality detection operation using the determined reference pressure and reference time.

Moreover, in another aspect, in detecting abnormality, the flow rate control device 10 may perform an operation to change in advance the upstream pressure P1 and the downstream pressure P2 (or specified value of flow rate) to conform to the measurement condition of the reference values.

Moreover, since the convergence pressure may be varied by a gas temperature T1, comparison with the reference value may be performed after the convergence pressure measured is corrected based on the gas temperature T1 in order to conform to the condition of the reference value. More specifically, based on an output T1 of the temperature sensor 16 such as a thermistor provided on the flow rate control 10, the arithmetic processing circuit 30 may be so configured to calculate the convergence pressure P''' which is obtained by correcting the convergence pressure P', and detect abnormality by comparing the corrected convergence pressure P''' with the reference pressure read out from the memory.

Figure 4:
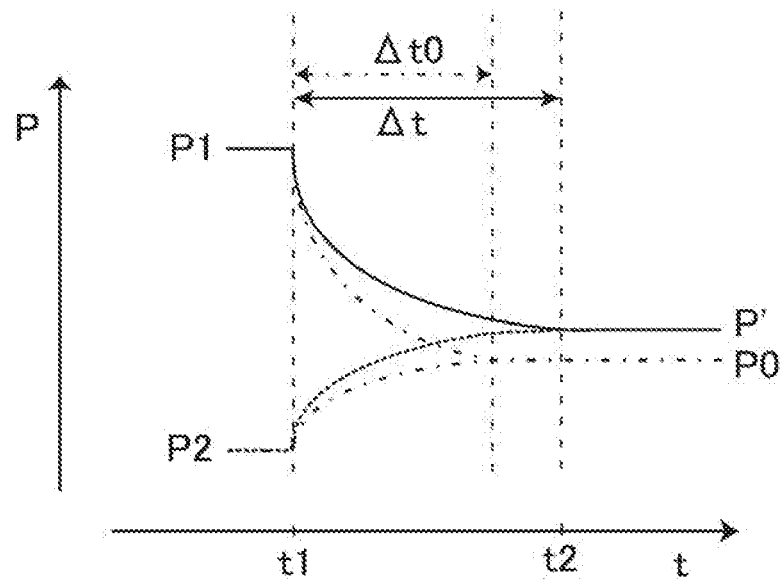
FIG. 4 is a graph which shows changes in an upstream pressure P1 and a downstream pressure P2 when a valve closing operation is performed from the time of fluid supply, in which a condition when an abnormality is occurring are indicated with a chain line.

FIG. 4 is a graph which shows an example of the changes in pressure when the convergence pressure P' and convergence time $\Delta t$ measured when abnormality is detected are shifted relative to the reference pressure P0 and reference time $\Delta t0$ determined from the measurement results at normal time (graph indicated with a chain line). As shown in FIG. 4, when abnormality is occurring, the changes in the upstream pressure P1 and downstream pressure P2 are different from those at normal time. As a result, the convergence pressure P' and convergence time $\Delta t$ have values different from those of the reference pressure P0 and the reference time $\Delta t0$.

An example of judgement of abnormality detection performed based on comparison between the reference value (Δt0, P0) in the normal state and the measurement value (Δt, P') will be described below When Δt>Δt0 and P'=P0:

When the measured convergence time Δt is greater than the reference time Δt0 and the measure convergence pressure P' is the same as the reference pressure P0, it can be judged that abnormality in the restriction portion, and more specifically, abnormality of clogging in the opening portion is occurring. This is presumably because it takes longer time to balance the differential pressure due to clogging in the opening portion.

When Δt<Δt0 and P'=P0:

When the measured convergence time Δt is less than the reference time Δt0 and the measured convergence pressure P' is the same as the reference pressure P0, it can be judged that abnormality in the restriction portion, and more specifically, expansion in the opening portion is occurring. This is presumably because it takes less time to balance the differential pressure due to expansion in the opening portion.

When Δt>Δt0 and P'>P0 (in the case shown in FIG. 4):

When the measured convergence time Δt is greater than the reference time Δt0 and the measure convergence pressure P' is higher than the reference pressure P0, it can be judged that abnormality of the control valve, and more specifically, the sheet leak of the control valve is occurring. This is presumably because the occurrence of sheet leak in the control valve placed on the upstream side (that is, the high pressure side) of the restriction portion results in a shift in the equilibrium pressure to the high pressure side. Moreover, it is thought that the occurrence of sheet leak make the convergence time longer.

When Δt>Δt0 and P'<P0:

When the measured convergence time Δt is greater than the reference time Δt0 and the measure convergence pressure P' is lower than the reference pressure P0, it can be judged that abnormality of the downstream valve, and more specifically, sheet leak in the downstream valve is occurring. This is presumably because the occurrence of sheet leak in the downstream valve placed on the downstream side (that is, the low pressure side) of the restriction portion results in a shift of the equilibrium pressure to the low pressure side. Moreover, it is thought that the occurrence of sheet leaks makes the convergence time longer.

The four examples were raised above to describe the method for judgement of abnormalities in the restriction portion, the control valve, and, the downstream valve, but abnormality can be also judged based on other comparison results. For example, when Δt=Δt0 and P'<P0, it can be also judged that expansion in the opening portion is occurring and sheet leak in the downstream valve is occurring.

Thus, by associating the abnormal state which has actually occurred with the comparison results between the reference values and measurement values in advance, they can be used as the judgement information for the occurrence of various abnormality. It should be noted that examples of detection of abnormality based on the comparison results of both the measured convergence time Δt and the convergence pressure P' in the above have been described, but examples are not limited to these, and detection of abnormality based on the measurement results of either one only may be performed. For example, when it is judged that the convergence time Δt is greatly higher than the reference value, sheet leak of the downstream valve and abnormality in the valve closing operation can be detected only with the results.

That is, in this embodiment, it is possible to perform at least one of step (a): a step of the upstream pressure at a point when a difference between the upstream pressure P1 and downstream pressure P2 reaches a predetermined value as the upstream convergence pressure, and detecting the downstream pressure as downstream convergence pressure, and step (b): a step of detecting the time from a point when the control valve and downstream valve are changed from an open state to a closed state to a point when a difference between the upstream pressure and downstream pressure reaches a predetermined value or becomes lower than the predetermined value as the convergence time, and the presence or absence of abnormality can be judged based on the comparison of the data (measurement values) obtained in step (a) and/or step (b) with the values (corresponding values) which are the references of the data.

Moreover, in the above, examples of detection of abnormality based on the magnitude relationship of the reference value and measurement value are shown, but more detailed or varied abnormality detection can be performed based not only on the magnitude relationship but also on the magnitude of the difference between the reference value and measurement value.

Embodiments of the present invention have been described above, but various modification can be made. For example, it may be so configured to, in a state that the control valve and downstream valve are maintained in a closed state, when the difference between the upstream pressure and downstream pressure is maintained to a constant shifted value above 0 even after the convergence, detect abnormality in the first pressure sensor or second pressure sensor based on the shifted value.

This is presumably because normally when both valves are closed, the upstream pressure and downstream pressure should converge to the same equilibrium pressure, but this is actually not the case since a failure or an error (shift in zero point, etc.) is occurring in the first pressure sensor or the second pressure sensor.

Moreover, when there is any inadequacy in the pressure sensor, the convergence pressures of the upstream pressure and downstream pressure are different, and the difference may not fall within a predetermined range even in the convergence state. Therefore, when the pressure difference due to a consistent error in the convergence state as mentioned above is observed, it may be so configured to determine the point of convergence with the pressure difference determined by removing this error by calculation.

It should be noted that International Application No. PCT/JP2016/004210 made by the applicant of the present invention describes in a channel in which valves on both sides nipping a restriction portion therebetween are closed, a technique for detecting abnormality of a pressure sensor on the upstream side and a pressure sensor on the downstream side from a difference between an upstream pressure P1 and a downstream pressure P2, and a similar technique can be applied also to the above-mentioned embodiments of the present invention. The entire disclosures of International Application No. PCT/JP2016/004210 are hereby incorporated by reference.

Furthermore, in the embodiments described in the above, at a point when the upstream pressure P1 and downstream pressure P2 reaches the substantially same equilibrium pressure after the valves are closed (that is, the point when the difference is substantially 0) is considered as the convergence time, and the pressure at that time is considered as the convergence pressure, but it is not limited to this example. As mentioned above, it may be so configured to consider the point when the difference between the upstream pressure P1 and downstream pressure P2 reaches a significant value (predetermined value) above 0 as the time of convergence, and compare the upstream pressure P1 (and the downstream pressure P2) at that time and the reaching time with the reference value at normal time measured by a similar measurement method to detect abnormality.

INDUSTRIAL APPLICABILITY

A method for detecting abnormality according to an embodiment of the present invention is especially suitably used in a fluid supply system including a flow rate control device, to detect abnormality of valves and a restriction portion.

EXPLANATION OF REFERENCES

2 Process chamber
4 Vacuum pump
10 Flow rate control device
12 Restriction portion
14 First pressure sensor
16 Temperature sensor
18 Control valve
19 Piezo element driven unit
24 Second pressure sensor
28 Downstream valve
30 Arithmetic processing circuit
40 External control device
42 Display portion

The invention claimed is:

1. An abnormality detection method using a flow rate control device comprising a restriction portion, a control valve provided on an upstream side of the restriction portion, a first pressure sensor provided on the upstream side of the restriction portion and on a downstream side of the control valve, and a second pressure sensor provided on a downstream side of the restriction portion, a downstream valve provided on a downstream side of the second pressure sensor,
the method detecting a presence or absence of abnormality in the control valve, the downstream valve, or the restriction portion, and comprising:
a step of changing the control valve and the downstream valve from an open state to a closed state when a gas is flowing through the flow rate control device,
a step of measuring an upstream pressure and a downstream pressure of a gas using the first pressure sensor and the second pressure sensor with the control valve and the downstream valve left in the closed state, and
at least one of step (a) and step (b) described below:
(a) a step of extracting an upstream pressure of the gas at a point when a difference between the upstream pressure and the downstream pressure of the gas reaches a predetermined value or becomes lower than the predetermined value as an upstream convergence pressure, and/or extracting the downstream pressure of the gas as a downstream convergence pressure,
(b) a step of extracting the time from a point when the control valve and the downstream valve are changed from the open state to the closed state to a point when a difference between the upstream pressure and the downstream pressure of the gas reaches a predetermined value or becomes lower than the predetermined value as a convergence time,
wherein the presence or absence of abnormality in the control valve, the downstream valve, or the restriction portion is judged based on a comparison of data of the upstream convergence pressure, the downstream convergence pressure, or the convergence time obtained in either the step (a) or the step (b) with a corresponding reference value of the data.

2. The abnormality detection method according to claim 1, the method comprising both the step (a) of extracting the upstream convergence pressure and/or the downstream convergence pressure, and the step (b) of extracting the convergence time, wherein the presence or absence of abnormality is judge based on a comparison of both data obtained in the step (a) and the step (b) with the reference values, respectively.

3. The abnormality detection method according to claim 1, wherein a reference pressure is used as the reference value for the upstream convergence pressure and the downstream convergence pressure, and a reference time is used as the reference value for the convergence time.

4. The abnormality detection method according to claim 3, wherein the reference pressure is a convergence pressure measured in advance in a normal state, and the reference time is a convergence time measured in advance in a normal state.

5. The abnormality detection method according to claim 3, the method further comprising:
a step of measuring an upstream pressure and a downstream pressure in the open state using the first pressure sensor and the second pressure sensor before the control valve and downstream valve are closed, and
a step of determining the reference pressure and the reference time based on the upstream pressure and the downstream pressure measured in the open state.

6. The abnormality detection method according to claim 5, the method comprising a step of preparing in advance a table which indicates a relationship between the upstream pressure and the downstream pressure in the open state and the reference time and the reference pressure, and a step of determining the reference pressure and the reference time according to the table.

7. The abnormality detection method according to claim 1, wherein the predetermined value of the difference between the upstream pressure and downstream pressure is set to 0, and at a point when the upstream pressure and the downstream pressure are the same, the upstream convergence pressure, the downstream convergence pressure or the convergence time is extracted.

8. The abnormality detection method according to claim 1, wherein a sheet leak of the control valve and the downstream valve is detected based on the upstream convergence pressure or the downstream convergence pressure, and expansion and reduction of an opening portion of the restriction portion is detected based on the convergence time.

9. The abnormality detection method according to claim 1, wherein the flow rate control device further comprises a temperature sensor provided on the downstream side of the control valve, and further comprise a step of correcting the upstream convergence pressure or the downstream convergence pressure based on an output of the temperature sensor.

10. The abnormality detection method according to claim 1, wherein in a state that the control valve and the downstream valve are maintained in the closed state, when a difference between the upstream pressure and the downstream pressure is maintained to be shifted from the reference value even after convergence, it is judged that the first pressure sensor or the second pressure sensor is in an abnormal state.

11. A pressure-type flow rate control device for detecting a presence or absence of abnormality in a control valve, a downstream valve, or a restriction portion, and comprising:
   the restriction portion,
   the control valve provided on an upstream side of the restriction portion,
   a first pressure sensor provided on the upstream side of the restriction portion and on a downstream side of the control valve,
   a second pressure sensor provided on a downstream side of the restriction portion, and
   an arithmetic processing circuit for controlling a flow rate to be a specified flow rate by controlling the control valve based on outputs of the first pressure sensor and the second pressure sensor,
   wherein the downstream valve which is built inside the flow rate control device or placed outside the flow rate control device is provided downstream of the second pressure sensor, and
   wherein the arithmetic processing circuit is configured to calculate a difference between an upstream pressure and a downstream pressure of a gas based on outputs of the first pressure sensor and the second pressure sensor in a state that the control valve is closed when the downstream valve is closed,
   perform either or both comparison of comparing the upstream pressure or the downstream pressure of the gas at a point when the difference obtained by the calculation reaches a predetermined value or becomes lower than the predetermined value with a reference pressure stored in a memory, and comparing a time from a point when the control valve and the downstream valve becomes closed to a point when the difference reaches a predetermined value or becomes lower than the predetermined value with a reference time stored in a memory, and
   generate an abnormality judgement signal based on comparison with the reference pressure or the reference time.

* * * * *